July 29, 1969  L. A. MITTEN  3,457,974
PRODUCTION OF STUD LUMBER FROM LOGS OF SMALL DIAMETER
Original Filed Nov. 10, 1965  7 Sheets-Sheet 1
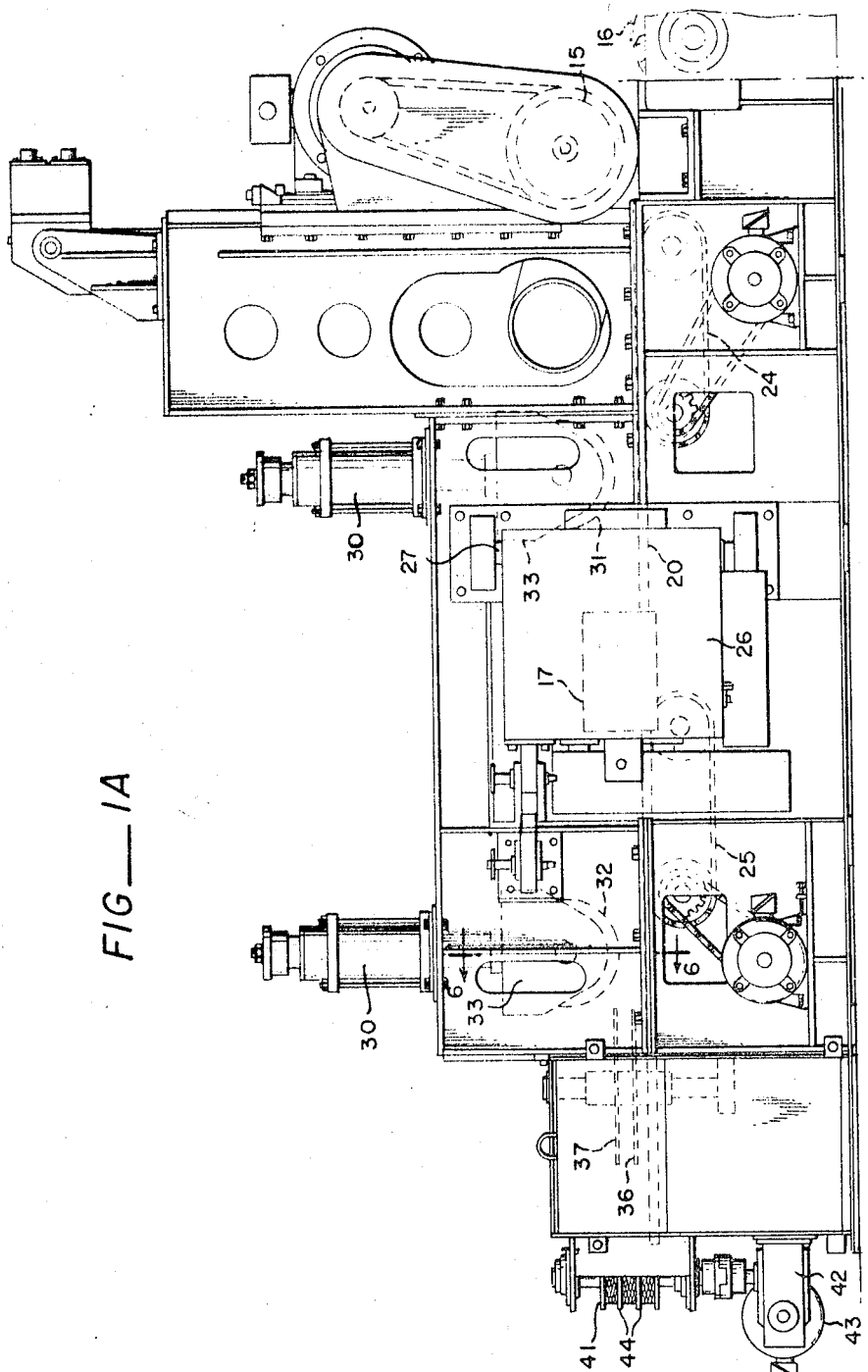
FIG—1A
INVENTOR.
LEONARD A. MITTEN
BY Seed & Berry
ATTORNEYS

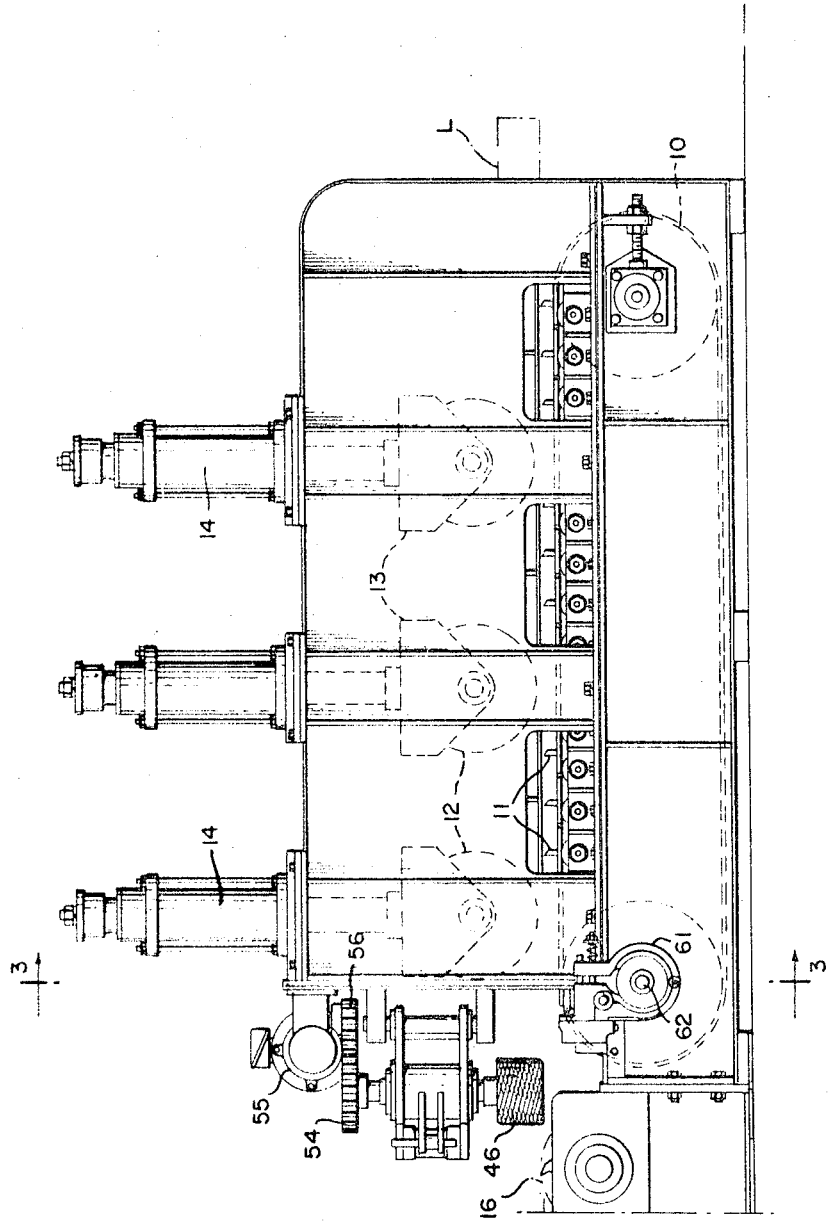

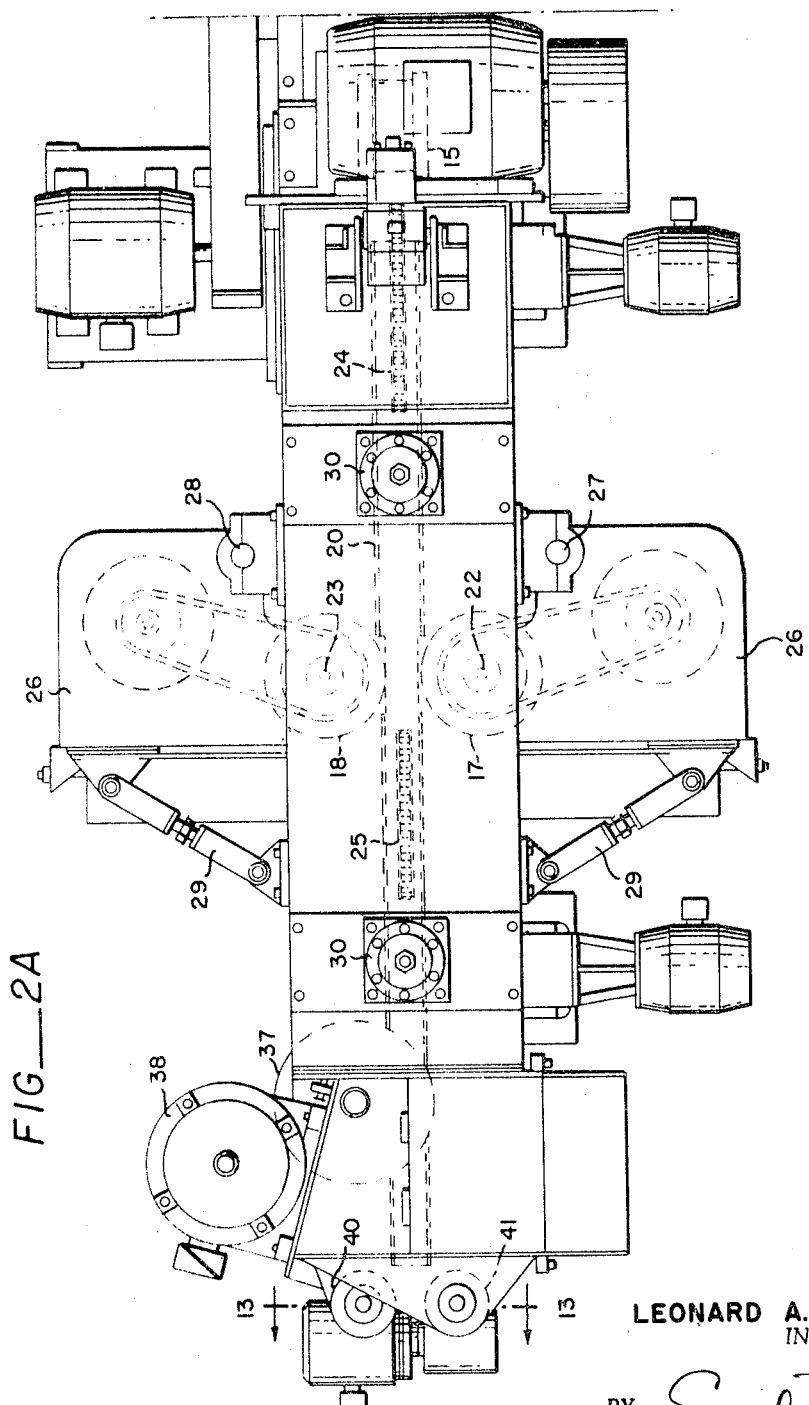

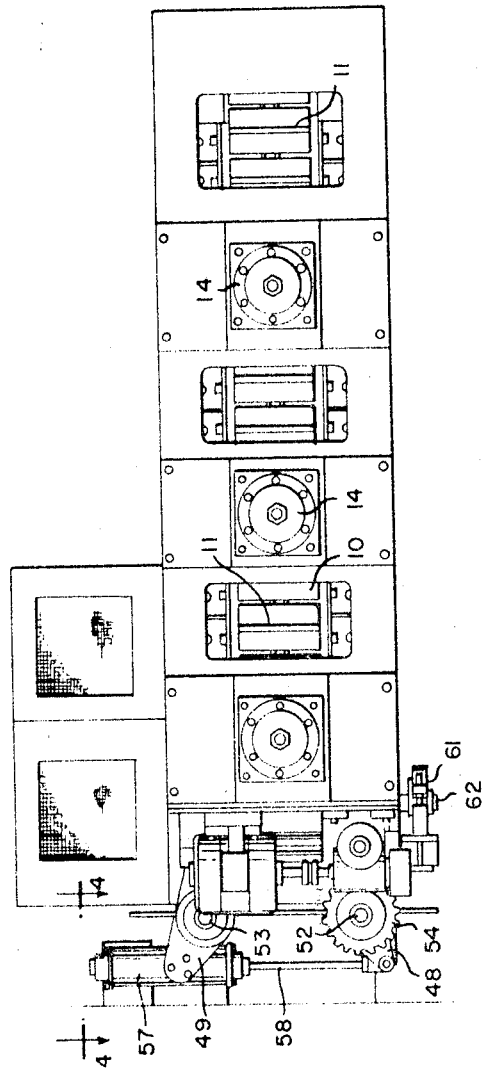
FIG_2B

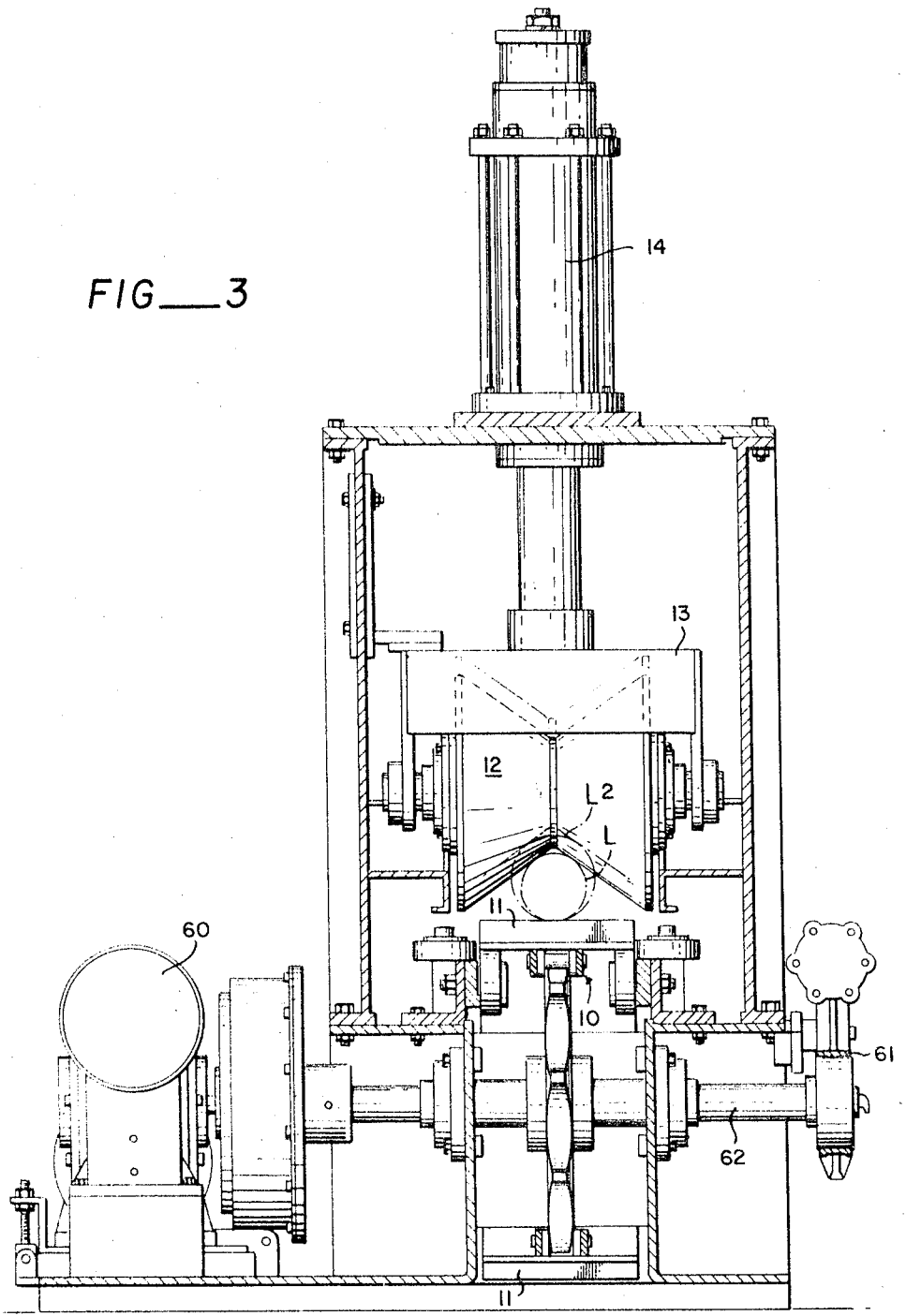

July 29, 1969
L. A. MITTEN
3,457,974
PRODUCTION OF STUD LUMBER FROM LOGS OF SMALL DIAMETER
Original Filed Nov. 10, 1965
7 Sheets-Sheet 6
FIG__4
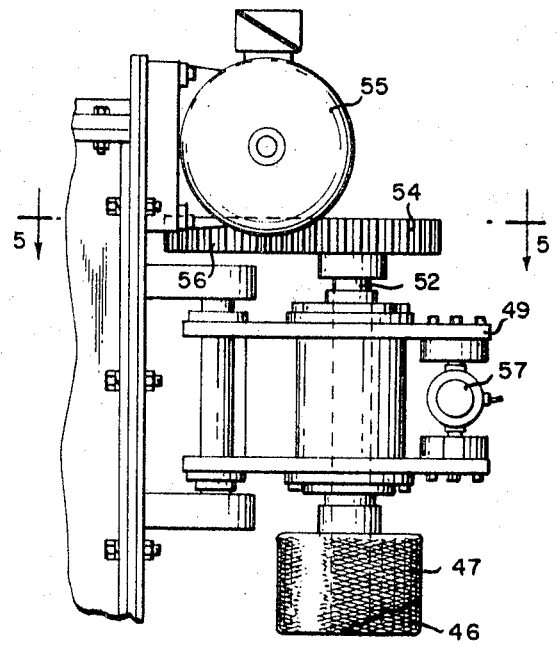
FIG__5
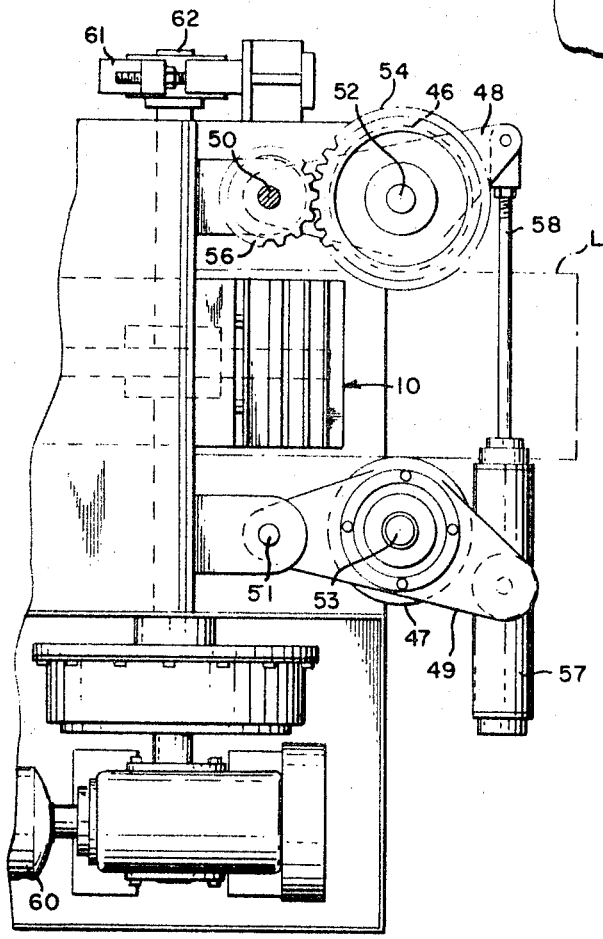
LEONARD A. MITTEN
*INVENTOR.*
BY
*ATTORNEYS*

July 29, 1969  L. A. MITTEN  3,457,974
PRODUCTION OF STUD LUMBER FROM LOGS OF SMALL DIAMETER
Original Filed Nov. 10, 1965  7 Sheets-Sheet 7
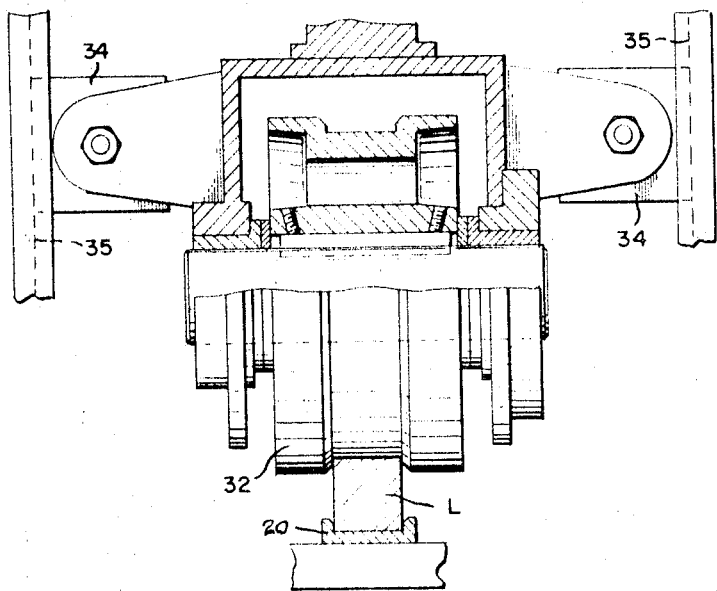
FIG__6
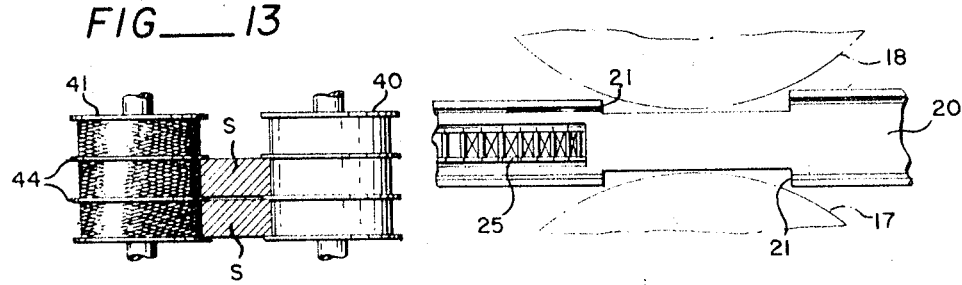
FIG__13  FIG__7
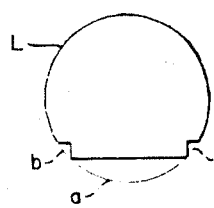 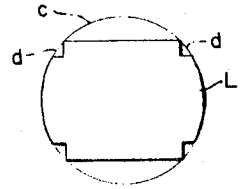 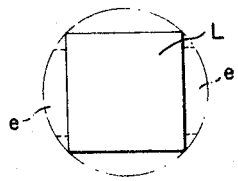 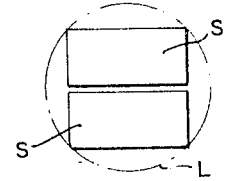
FIG__8  FIG__9  FIG__10  FIG__11
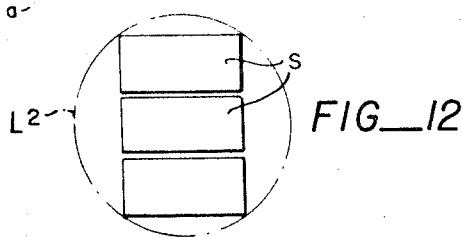
FIG__12
LEONARD A. MITTEN
INVENTOR.
BY Seed & Berry
ATTORNEYS

United States Patent Office 3,457,974
Patented July 29, 1969

3,457,974
PRODUCTION OF STUD LUMBER FROM LOGS OF SMALL DIAMETER
Leonard A. Mitten, Vancouver, British Columbia, Canada, assignor to Ernest E. Runnion, Shelton, Wash.
Original application Nov. 10, 1965, Ser. No. 507,111, now Patent No. 3,313,329, dated Apr. 11, 1967. Divided and this application Oct. 26, 1966, Ser. No. 589,667
Int. Cl. B27c 5/00
U.S. Cl. 144—3                                    4 Claims

ABSTRACT OF THE DISCLOSURE

This invention relates to machines for profiling logs by means of chipping heads to form rectangular cants and then sawing the cants into stud lumber. The machine is so designed to produce the maximum quantity of useable lumber from logs of a given diameter.

---

This invention relates to the cutting of small-diameter logs, and especially logs with diameters between 5″ and 8″, approximately, so as to obtain from such logs a maximum in stud lumber. In the accomplishment of this end I follow the general teachings of United States Patent No. 3,259,157, issued to Ernest E. Runnion under date of July 5, 1966. According to the present invention the log is conveyed horizontally along a linear travel path and in the course of its travel is subjected to the action of cutter heads. Depending upon whether the diameter of the conveyed log lies in a given upper bracket or a given lower bracket within said 5″ to 8″ range of diameters, the cutter heads profile the travelling log either to a 4″ x 4″ or a 4″ x 6″ rectangular cant. The cutter heads rotate in a "climb-cut" direction so that the profiling produces pulp chips rather than hog fuel. Proceeding beyond the cutter heads the cants are sawed into rough-cut studs. The sawing is so performed that two studs are produced from the square cant and three studs from the 4″ x 6″ cant. Throughout the profiling and sawing steps the log is so guided, by the employment of flat which the profiling produces, that the log is precluded from turning about its axis or in any way deviating from the established travel path. The present application is a division of application filed Nov. 10, 1965, Ser. No. 507,111, now issued as U.S. Patent No. 3,313,329, dated Apr. 11, 1967.

The invention has for its principal object the provision of a perfected machine which will efficiently perform its intended stud-producing function with speed and expedition in a continuous operation and with a minimum of attention.

A further and more particular object is to provide a machine and method which profiles the log in a new and advantageous manner.

As a still further particular object the invention aims to provide a perfected drive system for conveying the logs through the machine.

These and yet additional objects and advantages of the invention will appear and be understood in the course of the following description and claims, the invention consisting in the novel construction and in the adaptation and combination of parts hereinafter described and claimed.

In the accompanying drawings:

FIGURES 1A and 1B are side elevational views which, taken together, illustrate a stud mill constructed to embody the preferred teachings of the present invention.

FIGS. 2A and 2B are top plan views respectively related to the FIG. 1A and FIG. 1B parts of the mill.

FIG. 3 is a transverse vertical sectional view drawn to an enlarged scale on line 3—3 of FIG. 1B, and incorporating a phantom illustration of two sizes of log.

FIG. 4 is a fragmentary side elevation viewed from the vantage point shown at 4—4 in FIG. 2B, and employing a scale the same as that of FIG. 3.

FIG. 5 is a fragmentary horizontal sectional view drawn to an enlarged scale on line 4—4 of FIG. 4.

FIG. 6 is a fragmentary view employing the larger scale of FIGS. 3–5 and detailing the second of two rolls which perform a guide and press function, a first said roll being engaged by the log after two opposite faces of the log have been profiled and the second roll being engaged after the other two opposite faces have been profiled.

FIG. 7 is a top plan view illustrating a fragmentary portion of a shoe which performs a guide function upon the bottom and sides of the log after the initial profiling has been performed, and incorporating a phantom illustration of cutter heads which profile the flanks of the log.

FIGS. 8, 9, 10 and 11 are diagrammatic views showing sections of the log at different stages of the cutting process; and FIG. 12 is a diagrammatic view showing the output of three pieces of stud lumber from a 4″ x 6″ rectangular cant as compared with the two pieces shown in FIG. 11 produced from a 4″ x 4″ cant.

FIG. 13 is a transverse vertical sectional illustrating the roll-type outfeed conveyor.

Before proceeding with a detailed description of the mill, clarity will perhaps be advanced by here stating that a succession of conveyor devices move the log L through the mill. These conveyor devices have an in-line functional relationship so that the travel path is linear.

One said conveyor device located at the infeed end of the mill has considerable length and is comprised of an endless driven chain denoted by the numeral 10. The log is delivered to the upper run of the chain, bearing upon flights 11, and is engaged from above by a plurality of V-grooved press rolls 12. These press rolls are each journaled from a respective vertically movable carriage 13. Pressure air delivered to an overhead double-acting cylinder 14 exerts downward pressure upon the press rolls. As hereinbefore stated the present mill is designed to handle two sizes of logs, and namely logs having a diameter which falls in either the upper or the lower of two size categories within a given range of diameters. Hereinafter described, only one of four cutter heads and two overhead guide rolls need be shifted (into a selected one of two positions) in order to adapt the mill to these two sizes of logs.

The infeed conveyor may be said to comprise a "reading" station in that the diameter of each log is determined by a sensing device in the course of the log's traversal of the infeed conveyor. Should the sensed diameter show that a log has a diameter placing the same in a bracket different from that of the preceding log, the sensing device acts through suitable circuitry, which is or may be similar to that shown and described in said Patent No. 3,259,157, to set into action a sequence of operations. These operations consist in (1) arresting the travel of the sensed log, (2) shifting (by pressure air) the two-position head and the overhead guide rolls from the then-occupied to the other of their two positions only when the trailing end of the preceding log has moved beyond the cutterheads and cleared the second of said two overhead guide rolls, and (3) again conveying the sensed log. As conveyor devices which act in complement with the infeed chain conveyor to move the log through the mill there is additionally provided a roll-type infeed conveyor, two chain-type mid-feed conveyors, and a roll-type outfeed conveyor. All have a uniform conveying speed. The roll-type infeed conveyor will be hereinafter particularly described but suffice it to here say that the same lies to the rear of the infeed chain's after end and engages the flank faces of the log.

The shiftable cutter head 15 and one head 16 of the three non-shiftable heads perform their chipping actions upon the log's upper side and upon the log's underside, respectively. The other two heads 17 and 18 chip opposite sides of the log. All four heads are continuously driven and turn in a "climb-cut" direction. Knives with which the several cutter heads are fitted are so arranged that the log, upon clearing the four heads, is profiled either to the square cross-sectional configuration shown in FIG. 10 or the rectangular cross-sectional configuration shown in FIG. 11. The top and bottom heads 15 and 16 have an identical profiling action, each chipping a segmental portion and two triangular notch portions from the log's periphery. This is accomplished by having a center set of knives which cut on a common plane parallel to the rotary axis, and flanking knives at each of the two sides of the center knives, the flanking knives protruding a moderate distance beyond the cutting plane of the center knives and having a cutting plane parallel therewith. The bottom head 16 acts momentarily in advance of the top head 15, and the portions removed thereby are designated by $a$ and $b$ in FIG. 8. The portions which the top head removes are denoted by $c$ and $d$ in FIG. 9. The side cutter heads 17 and 18 are located immediately behind the upper head and their chipping knives are arranged to cut on planes which are normal to the center or chordal cuts of said top and bottom heads and spaced inwardly "shave" distances beyond the planes in which the vertical walls of the notches lie. The side heads thus each remove from the advancing log the corner-abbreviated side segments denoted by $e$ in FIG. 10. The side heads each admit of making a cut longer than 6" so that, regardless of whether the cant being produced is 4" x 4" or 4" x 6", the cuts made by the side heads include shavings taken from the vertical walls of the notches. This assures that the produced cant has smooth faces on both of its sides as well as the top and bottom.

The purpose in having the upper and lower cutter heads so formed that they notch the log top and bottom at each side of the horizontal flats is that the vertical faces provided by the notches act with said horizontal flats to produce guide surfaces which wipe against top and bottom guides to constrain the log against any deviation from a straight-line travel as the log traverses the station occupied by the two side cutter heads. The bottom guide comprises a channel-shaped shoe 20 which receives the log immediately behind the bottom cutter head and extends therefrom to a point closely adjacent to the mill's outfeed end. This shoe (see FIG. 7) has its sides cut away, as at 21, for a short distance extending in both directions from a transverse vertical plane occupied by the arbors 22 and 23 for the side cutter heads, and is characterized in that the span at the rear of this cut-away section is moderately narrower than the span at the front of such section. This is perforce in compensation of the fact that the vertical faces of the notches are "shaved" back by the side cutter heads. Guide shoe 21 has its bottom wall slotted and the upper runs of the two mid-feed endless conveyor chains, denoted by 24 and 25, are accommodated in these slots. Flights on the chains protrude in a moderate degree above the upper surface of said bottom wall.

The vertical arbors 22 and 23 for the side cutter heads are journaled in box housings 26 each trunnion-mounted, as at 27 and 28, from the frame of the mill. Turnbuckles 29 hold the housings in adjustably set positions.

The guiding of the top of the log is performed by the aforementioned two overhead rolls. Circumferentially grooved and denoted by 31 and 32, these guiding press-rolls are located one to the front and the other to the rear of the station occupied by the side cutter heads. Each is journaled from a respective carriage 33 for free rotation about a transverse horizontal axis. Wing sections 34 (FIG. 6) working in slide-ways 35 guide the carriages for non-turning vertical movement between a lowered position functional to a 4 x 4 cant and an elevated position functional to a 4 x 6 cant. Pressure air delivered to a respective overhead double-acting cylinder 30, and made to work in concert with the shifting of the two-position cutter head 15, moves each press roll 31 and 32 between its two positions.

The sawing of the conveyed cants is performed by either one or two vertically spaced apart circular saw blades, as 36 and 37, fixed to a common saw arbor which is journaled to turn about a vertical axis located behind the side cutter heads proximal to but spaced to one side of the travel path of the cants. One blade is spaced 2" above the plane in which the upper surface of the bottom guide channel 20 lies. The other blade is spaced 4" above such plane. A motor drive for the saw arbor is denoted by 38.

The roll-type outfeed conveyor operates behind the saw and performs a guide function as well as continuing the feed previously performed by the chains and the roll-type infeed conveyor. It is comprised of a set of two rolls, one roll 40 being smooth-faced and free-turning and the other roll 41 having a knurled surface and being power-driven through a reduction gear box 42 from an electric motor 43. Both rolls 40 have a 6" length, with two end flanges and two separator flanges dividing each roll into three cylindrical tongue sections. The separator flanges 44 lie co-planar with the saw blades 36 and 37. Roll 41 is continuously driven, as are both of the mid-feed conveyor chains.

Reverting now to the roll-type infeed conveyor, the same is comprised of a set of two knurled rolls. One roll 46 is continuously driven. The other roll 47 is free-turning. As can be best seen from an inspection of FIG. 5, the two rolls occupy positions one at one side and the other at the other side of the travel path of the log and are each carried by a respective one of two third-order levers, as 48 and 49, comprised in each instance of an arm assembly pivoted from the mill frame for opposing in-and-out swing movement about a respective one of two vertical pins 50 and 51 as a fulcrum. The rolls are located intermediate the ends of the arm assemblies, with roll 46 being fixed to the lower end of a live spindle 52 and roll 47 being fixed to the lower end of an idler spindle 53. A gear 54 journaled above the arm assembly 48 for rotation about the center of the fulcrum pin 50 as an axis is driven off the output end of a reduction gear box powered from an electric motor 55, and passes power to the live spindle 52 by meshing a gear 56 fixed to the live spindle. A double-acting air cylinder 57 is connected by trunnion pins to the free end of one of the lever assemblies, and the rod 58 of a piston which works in said cylinder is connected by trunnion pins to the free end of the other lever assembly. A micro-switch (not shown) occupies the transverse vertical plane in which the rotary axes of the two knurled rolls lie, in the path travelled by the conveyed log, and when depressed by the log acts through an electric circuit to shift a control valve from a normal position whereat pressure air is charged to the outer end of the cylinder 57 and dumped from the inner end into a position whereat the converse action takes place, one namely which closes the rolls upon the log. The control valve is shifted back to normal, so that the rolls open, when the log's trailing end clears the micro-switch.

The arrestation of a log's travel, when its sensed diameter requires a shifting of the top cutter head 15 and the overhead guide rolls 31 and 32, is accomplished by breaking an electric circuit which, when completed, powers an electric motor 60 and releases a normally-set brake 61. The motor acts through reduction gears to drive a live shaft 62 for the driving sprocket wheel of the infeed conveyor 10. The brake acts upon a drum which is fixed to an end of said shaft 62.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In a mill for profiling a log to produce a flat-sided cant, means for conveying a log along an established travel path, cutting means stationed at the infeed end of the travel path for progressively removing from the periphery of the log a segmental portion and two notches, the chord of said segment defining a flat upon the log and the notches being let in from said flat at opposite ends thereof, the notches presenting a respective inner wall paralleling and spaced like distances from a diameter of the log located normal to that flat, guide means bearing against said inner walls of the notches and made to operate as soon as said notches take shape upon the log holding the log against deviation from its prescribed travel path as the following portion of the conveyed log progresses through the cutting means, and a cutting means for progressively removing from the conveyed log two other segmental portions the chords of which define two flats each of which is co-planar with a respective one of the two notches.

2. A mill as claimed in claim 1, said last-named cutting means so performing their cutting function that shavings are taken from the inner walls of the notches.

3. A mill as claimed in claim 1 in which the cutting means are comprised of cutter heads rotating in a climb-cut direction causing the segments to be removed in the form of pulp chips.

4. A mill as claimed in claim 1 in which there is also provided cutting means for removing from the log a segmental portion the chord of which defines a flat located diametrically opposite and parallel with the first-named flat, the spacing between said first-named and said last-named flats being a multiple of 2", and saw means stationed beyond said several cutting means in the path traveled by the conveyed log and comprising at least two blades cutting in planes which parallel the planes of said first-named and last-named flats and are spaced at 2" intervals one from another and from an adjacent said flat.

References Cited

UNITED STATES PATENTS

| | | | |
|---|---|---|---|
| 1,696,502 | 12/1928 | Peterson. | |
| 3,153,962 | 10/1964 | Mercer et al. | 83—436 X |
| 3,259,157 | 7/1966 | Runnion | 144—312 |

FOREIGN PATENTS

| | | |
|---|---|---|
| 788,839 | 1/1958 | Great Britain. |

ANDREW R. JUHASZ, Primary Examiner

FRANK T. YOST, Assistant Examiner

U.S. Cl. X.R.

144—246